(12) United States Patent
Sato et al.

(10) Patent No.: US 12,443,379 B2
(45) Date of Patent: Oct. 14, 2025

(54) COLLISION AVOIDANCE AR APPLICATION

(71) Applicant: Rakuten Mobile, Inc., Tokyo (JP)

(72) Inventors: Hitomi Sato, Tokyo (JP); Takuya Miyazawa, Tokyo (JP); Kei Sakaguchi, Tokyo (JP); Gunhee Cho, Tokyo (JP); Hiroki Matsuo, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 0 days.

(21) Appl. No.: 18/742,078

(22) Filed: Jun. 13, 2024

(65) Prior Publication Data

US 2025/0244935 A1   Jul. 31, 2025

(30) Foreign Application Priority Data

Jan. 29, 2024 (JP) ................ 2024-011330
Mar. 13, 2024 (JP) ................ 2024-038760

(51) Int. Cl.
*G06F 3/14* (2006.01)
*G08B 21/02* (2006.01)

(52) U.S. Cl.
CPC ............ *G06F 3/14* (2013.01); *G08B 21/02* (2013.01)

(58) Field of Classification Search
CPC ........ G06T 19/006; G06F 3/011; G06F 3/012; G06F 3/013; G06V 20/20; B60K 2360/177; G02B 27/017; G02B 2027/0178; G02B 27/0176; G02B 27/0172; B60R 21/0134; B60R 2300/8093; B60R 2021/01013; B60T 2201/022; B60T 2201/024; B60W 30/095; B60W 30/08; B60Q 9/008; B60Q 5/006; G08G 1/16; G05D 1/0289; B25J 9/1666; B25J 9/1676
See application file for complete search history.

(56) References Cited

U.S. PATENT DOCUMENTS

| | | | |
|---|---|---|---|
| 10,332,292 B1* | 6/2019 | Arnicar | B60K 35/235 |
| 11,900,795 B2* | 2/2024 | Ueno | G02B 27/0101 |
| 2023/0322248 A1* | 10/2023 | Weiss | B60W 30/18154 340/435 |
| 2025/0058770 A1* | 2/2025 | Larsson | B60W 40/09 |

FOREIGN PATENT DOCUMENTS

JP    2023-091191 A   6/2023

* cited by examiner

*Primary Examiner* — Koosha Sharifi-Tafreshi
(74) *Attorney, Agent, or Firm* — Sughrue Mion, PLLC

(57) ABSTRACT

AR glasses includes one or more processors, and at least one of the one or more processors performs: receiving processing of receiving collision prediction information including location information about a dangerous area where a user is predicted to collide with a mobile object and information regarding a trajectory of the mobile object, from an external apparatus; determining processing of deriving a distance between the dangerous area and the user on the basis of the collision prediction information, to determine a danger level corresponding to the distance; generating processing of generating content that prompts danger avoidance depending on the danger level; and display control processing of displaying the content on a display.

9 Claims, 7 Drawing Sheets

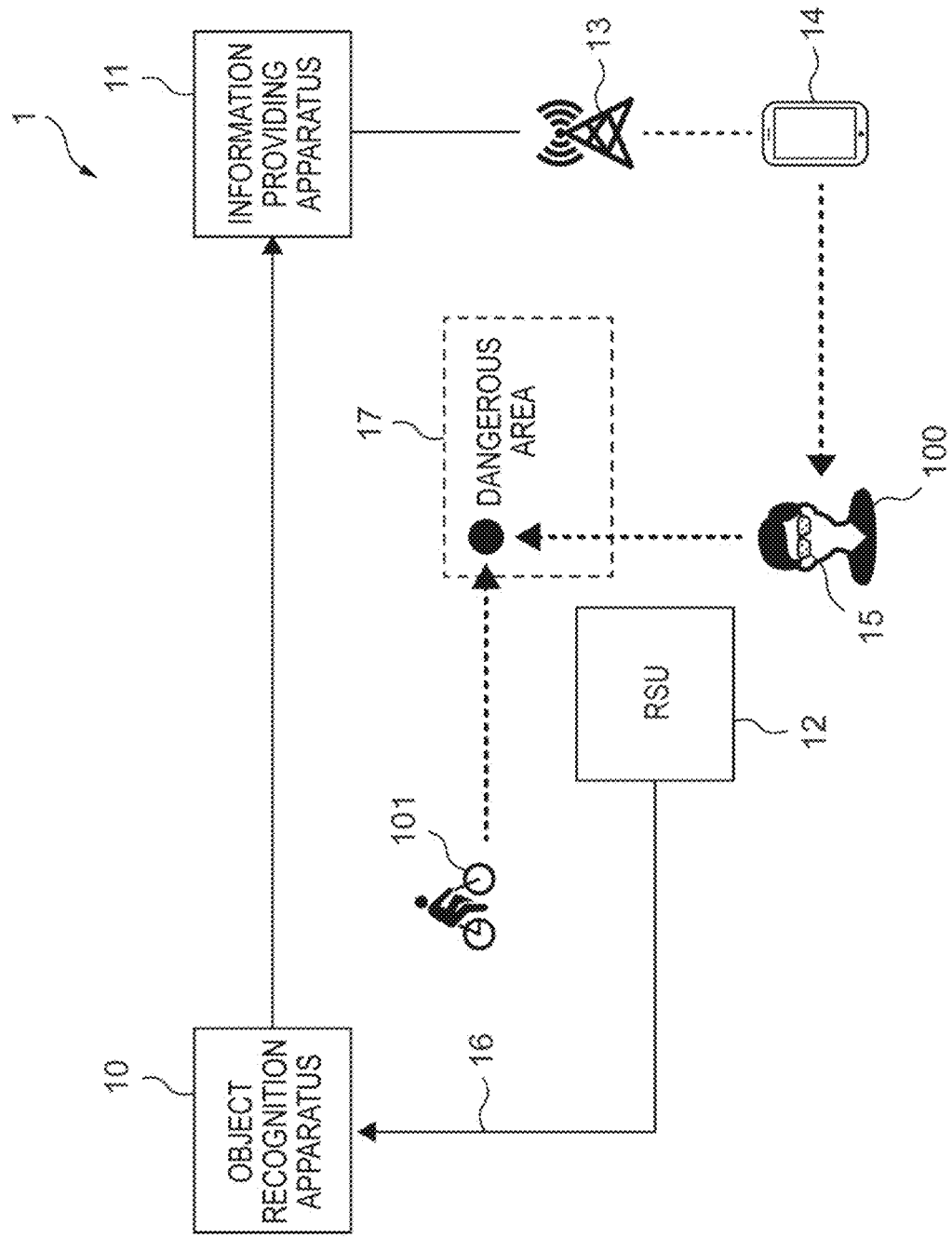

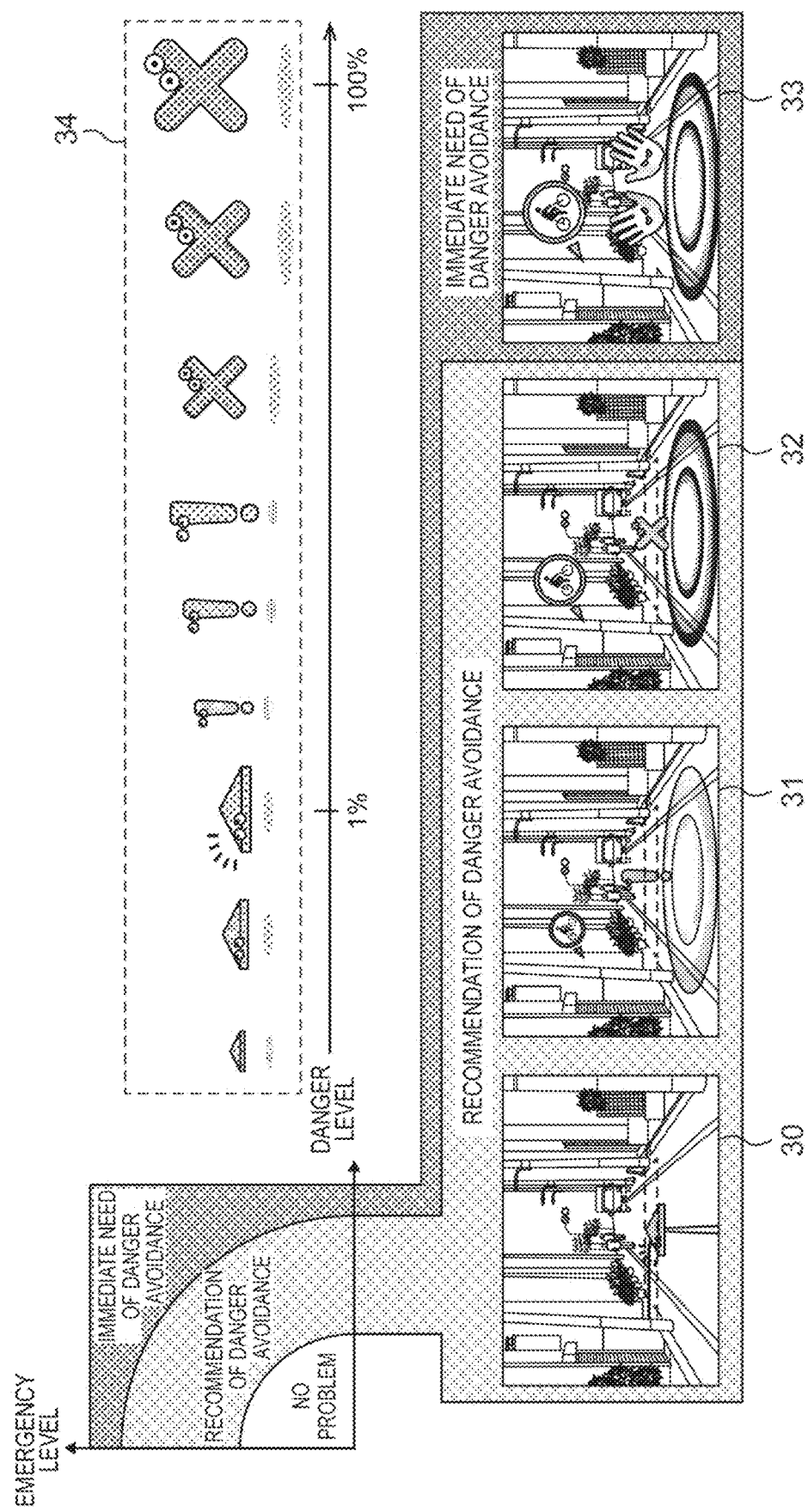

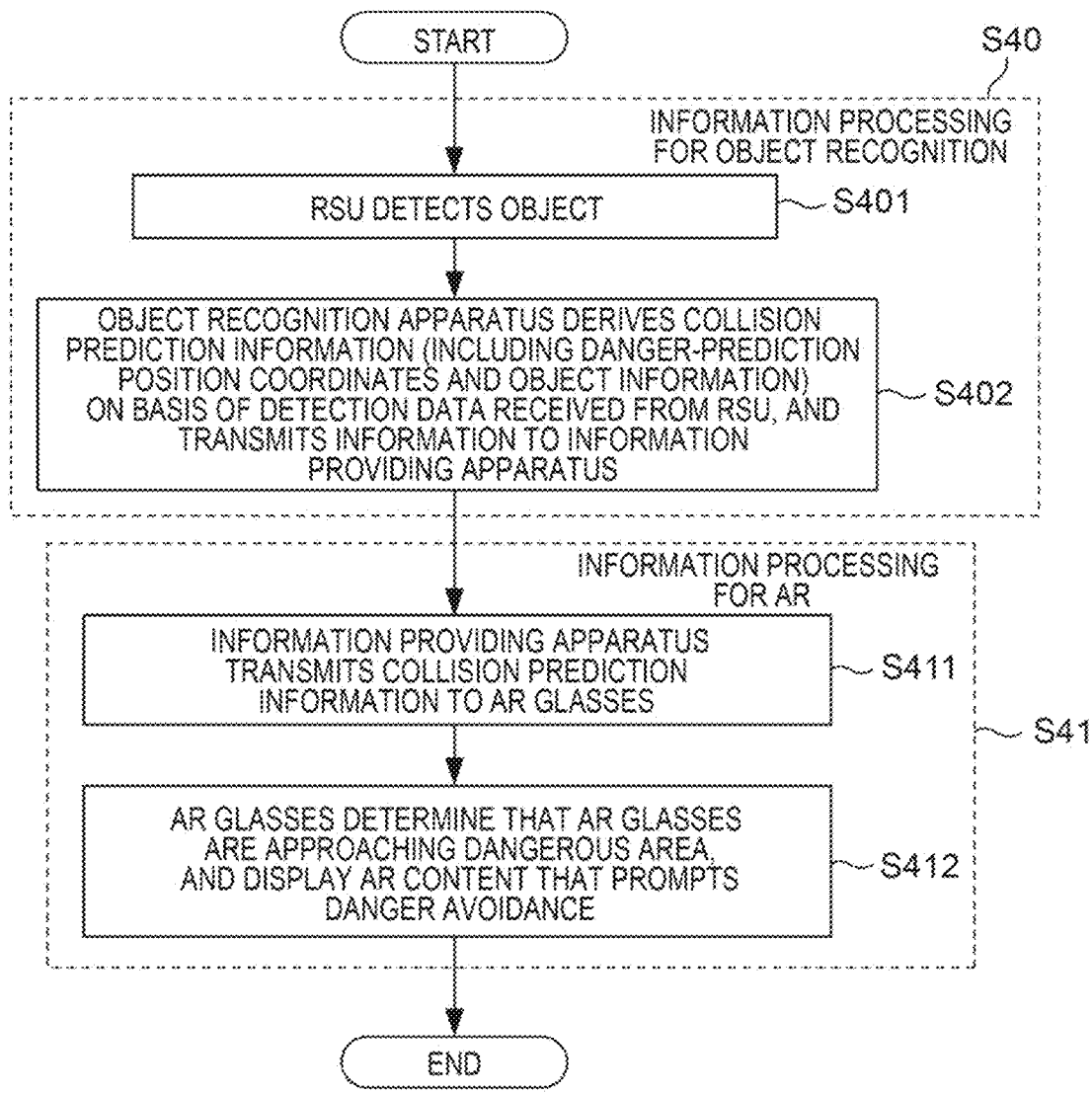

COLLISION AVOIDANCE AR APPLICATION

CROSS-REFERENCE TO RELATED APPLICATION(S)

This application claims priority to Japanese patent applications No. 2024-011330, filed on Jan. 29, 2024, and No. 2024-038760, filed on Mar. 13, 2024; the entire contents of which are incorporated herein by reference.

TECHNICAL FIELD

The present disclosure relates to an AR application for avoidance of collision with a mobile object.

BACKGROUND ART

In recent years, there has been developed a technology for detecting a possibility of collision with a mobile object and providing information regarding the detection. For example, in JP 2023-091191 A, there is disclosed a collision-possibility determination apparatus that determines a possibility of collision between mobile objects such as vehicles being moving, and notifies a result of the determination to a communication terminal device worn by a user using one of the mobile objects.

SUMMARY OF THE INVENTION

According to the technology disclosed in JP2023-091191 A, the user who is using one of the mobile objects is notified of a possibility of collision with another mobile object, so that collision between the mobile objects can be avoided. However, according to the technology, each mobile object is required to periodically transmit the location information thereof to the collision-possibility determination apparatus at a predetermined frequency, and thus the technology cannot be applied to a mobile object that does not transmit the location information thereof. Hence, there is a demand for a technology for detecting collision between mobile objects without using location information, and providing information regarding the detection.

For example, in a case where there is a possibility that a user who is walking (pedestrian) and a bicycle that is travelling from a direction outside the field of view of the user come into contact with each other at an intersection, a system that determines a possibility of collision without using location information about the user and the bicycle can be used regardless of whether or not the bicycle or the user includes a terminal device capable of acquiring the location information, which is advantageous. Here, in a case where the user wears a transparent display through which the back can be seen, and information regarding a possibility of collision or danger is shown on the transparent display through an augmented reality (AR) application, the user can check the information in their field of view, which is more advantageous.

In view of such an issue, an object of the present disclosure is to provide a technology for realizing an AR application for avoiding collision with a mobile object.

AR glasses according to one aspect of the preset disclosure include one or more processors, wherein at least one of the one or more processors performs: receiving processing of receiving collision prediction information including location information about a dangerous area where a user is predicted to collide with a mobile object and information regarding a trajectory of the mobile object, from an external apparatus; determining processing of deriving a distance between the dangerous area and the user on the basis of the collision prediction information, to determine a danger level corresponding to the distance; generating processing of generating content that prompts danger avoidance in accordance with the danger level; and display control processing of displaying the content on a display.

A control method according to one aspect of the present disclosure is a control method performed by a communication apparatus, including: receiving collision prediction information including location information about a dangerous area where a user wearing AR glasses is predicted to collide with a mobile object and information regarding a trajectory of the mobile object, from an external apparatus; deriving a distance between the dangerous area and the user on the basis of the collision prediction information, to determine a danger level corresponding to the distance; generating content that prompts danger avoidance in accordance with the danger level; and displaying the content on a display of the AR glasses.

A communication system according to one aspect of the present disclosure includes a first apparatus, a second apparatus, and AR glasses, wherein each of the first apparatus, the second apparatus, and the AR glasses includes one or more processors, and at least one of the one or more processors performs: processing in which the first apparatus detects a mobile object, generates collision prediction information including location information about a dangerous area where a user wearing the AR glasses is predicted to collide with the mobile object and information regarding a trajectory of the mobile object, and transmits the collision prediction information to the second apparatus: processing in which the second apparatus receives the collision prediction information from the first apparatus, generates AR collision prediction information based on the collision prediction information, and transmits the AR collision prediction information to the AR glasses; and processing in which the AR glasses receive the AR collision prediction information from the second apparatus, derive a distance between the dangerous area and the user on the basis of the AR collision prediction information, generate content that prompts danger avoidance in accordance with a danger level determined in accordance with the distance, and display the content on the display.

According to the technology of the present disclosure, there is provided a technology for realizing an AR application for avoiding collision with a mobile object.

Objects, aspects, and effects of the present invention described above and objects, aspects, and effects of the present invention not described above will be understood by those skilled in the art from the following embodiments with reference to the accompanying drawings and the description of the claims.

BRIEF DESCRIPTION OF THE DRAWINGS

FIG. 1 illustrates an example of a configuration of a communication system according to an embodiment;

FIG. 3 is a conceptual diagram illustrating a relationship between a danger level and an image displayed in the AR glasses;

FIG. 4 illustrates a flowchart of processing performed in the communication system according to the embodiment;

EMBODIMENTS OF THE INVENTION

Figure 2A:
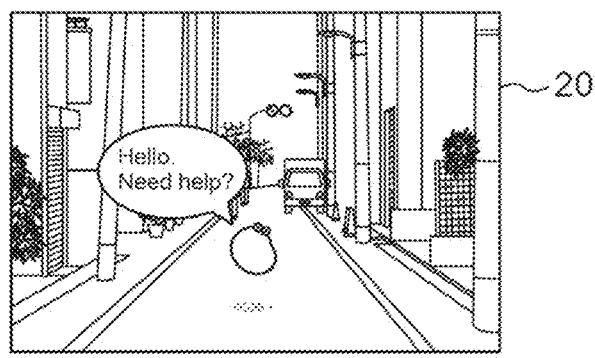
FIG. 2A illustrates an example of an image displayed in AR glasses.

Hereinafter, an embodiment of the present disclosure will be described in detail with reference to the accompanying drawings. Among the components disclosed below, components having the same function are denoted by the same reference symbols, and the description thereof will be omitted. Note that the embodiment disclosed below is one embodiment of the present disclosure, and should be appropriately modified or changed in accordance with the configuration of the apparatus and various conditions, and the present disclosure is not limited to the following embodiment only. In addition, all combinations of features described in the present embodiment are not necessarily essential to solution of the above-described issue.

In the embodiment disclosed below, it is assumed that a network (5G network) compliant with the fifth generation (5G) specified in the 3rd Generation Partnership Project (3GPP (registered trademark)) is used as a network to which the technology according to the present disclosure is applied. Note that the network referred to here also includes user equipment. Note that the technology according to the present disclosure may be applied to networks other than a 5G network.

Configuration of Communication System

FIG. 1 illustrates an example of a configuration of a communication system 1 according to the present embodiment. The communication system 1 includes an object recognition apparatus 10, an information providing apparatus 11, a roadside unit (RSU) 12, a wireless base station 13, user equipment (UE) 14, and AR glasses 15.

The object recognition apparatus 10 is a server device (edge server) for edge computing (multi-access edge computing (MEC) in the present embodiment), and is configured to be communicable with the information providing apparatus 11 and the RSU 12. The information providing apparatus 11 is a server device (edge server) for edge computing (MEC in the present embodiment), and is configured to be communicable with the object recognition apparatus 10 and the wireless base station 13. The RSU 12 is a roadside communication apparatus provided around a road, and is configured to be communicable with the object recognition apparatus 10 via a wired network 16. Note that, in the present embodiment, the RSU 12 is configured to be communicable with the object recognition apparatus 10 via the wired network 16, but may be configured to be communicable with the object recognition apparatus 10 via a wireless network with intervention of a wireless base station (not illustrated) or the like. The wireless base station 13 is configured to be communicable with the information providing apparatus 11 and the UE 14. The UE 14 is a communication apparatus having a communication function compliant with 5G, and is configured to be communicable with the wireless base station 13 and the AR glasses 15. The AR glasses 15 include a transparent display through which the back can be seen, are worn by a user 100, and are configured to be communicable with the UE 14. The user 100 can view an image (hereinafter also referred to as an AR image) displayed by the AR glasses 15 while viewing the real world. Specifically, the field of view of the user 100, that is, an AR image, includes an area of the real world that is not AR content displayed by the AR glasses 15 and an area of AR content displayed by the AR glasses 15. Note that the configuration of the system 1 illustrated in FIG. 1 is one example, and the system 1 may include a plurality of RSUs, or another device may be configured to be communicable with the devices illustrated in the drawings.

In the present embodiment, an object (mobile object) that is moving and can possibly collide with the user 100, such as a vehicle or another user, is referred to as a collision object 101. An example of the embodiment is described by using a bicycle as the collision object 101 (, and thus, the collision object 101 will hereinafter be also referred to as a bicycle 101).

In the present embodiment, a situation is supposed in which the bicycle 101 is travelling from a direction outside the field of view of the user 100. For example, the user 100 is passing a road having an intersection of low visibility at a small distance from the user, and the bicycle 101 is traveling toward the intersection on a road different from the road where the user 100 is. The bicycle 101 gets into a blind spot of the user 100, and the bicycle 101 and the user 100 cannot recognize the locations of each other. If the user 100 and the bicycle 101 arrive at the intersection at the same time, the bicycle 101 and the user 100 can possibly collide at the intersection.

In such a situation, the RSU 12 that has detected the bicycle 101 predicts a trajectory of the bicycle 101, and also predicts a predicted arrival point where the bicycle 101 is to arrive at a predetermined time. The RSU 12 predicts a trajectory of the bicycle 101 and a predicted arrival point where the bicycle 101 is to arrive after a predetermined time period using, for example, light detection and ranging (LiDAR) or an existing object recognition technology. The LiDAR is a technology of applying laser light and measuring a distance to an object, a shape of the object, and the like on the basis of information about reflection of the laser light. The RSU 12 derives various parameters (detection data regarding object detection) based on the predicted trajectory and the predicted arrival point, and transmits the parameters to the object recognition apparatus 10 via the wired network 16. Further, the RSU 12 may predict a trajectory of the user 100 (or the UE 14 or the AR glasses 15) and a predicted arrival point where the user 100 is to arrive after a predetermined time period, derive various parameters on the basis of the trajectory and the predicted arrival point of the user 100, and transmit the parameters to the object recognition apparatus 10. Note that, in the present embodiment, the RSU 12 is configured to transmit various parameters to the object recognition apparatus 10, but the RSU 12 is only required to be configured to derive and transmit data based on a predicted trajectory and a predicted arrival point.

The object recognition apparatus 10 receives the various parameters from the RSU 12, predicts (detects) a collision possibility, and derives information (hereinafter also referred to as collision prediction information) regarding a collision possibility. In the present embodiment, the object recognition apparatus 10 derives (determines), from map information and the received various parameters, coordinates (hereinafter also referred to as danger-prediction location coordinates) of a location of an area 17 (hereinafter also referred to as a dangerous area 17) presumed to be dangerous, in a predetermined coordinate space in the map information. The dangerous area 17 may be an area (predicted collision area) having a certain area or may be defined as a certain point (predicted collision point). For example, in FIG. 1, the dangerous area 17 is a predicted collision area where the bicycle 101 and the user 100 are predicted to collide. Further, the object recognition apparatus 10 derives information (hereinafter also referred to as object information) based on a trajectory of the bicycle 101 from the map information and the received various parameters. The object information can be coordinate data of a trajectory of the bicycle 101 in the coordinate space. Here, the coordinate data may be coordinate data of a location of the front end of the bicycle 101. Alternatively, the coordinate data may be coordinate data to which time information is added. Alternatively, the coordinate data may be data based on a current location of the bicycle 101 and a predicted trajectory of the bicycle 101 to the dangerous area 17. Alternatively, the coordinate data may be replaced with another kind of information indicating a location. The object recognition apparatus 10 includes the danger-prediction location coordinates and the object information in the collision prediction information. Note that the object recognition apparatus 10 may derive other information on the basis of the parameters received from the RSU 12 and include the derived information in the collision prediction information.

Subsequently, the object recognition apparatus 10 transmits (push transmission) the collision prediction information to the information providing apparatus 11. In the present embodiment, the object recognition apparatus 10 transmits the danger-prediction location coordinates and the object information to the information providing apparatus 11. The information is transmitted via, for example, a private network based on 5G. Further, the information may be transmitted using a request of a POST method according to a hypertext transfer protocol (HTTP). The request can include parameters and data in the body part thereof. The data format is, for example, the Json format.

The information providing apparatus 11 receives the collision prediction information (the danger-prediction location coordinates and the object information) from the object recognition apparatus 10. The information can be received using Representational State Transfer Application Programming Interface (REST API). The information providing apparatus 11 transmits the received collision prediction information to the UE 14 via the wireless base station 13. The information can be transmitted using the WebSocket API.

The information providing apparatus 11 may generate collision prediction information (AR collision prediction information) to be transmitted to the AR glasses 15 via the UE 14, on the basis of the collision prediction information received from the object recognition apparatus 10, and transmit the AR collision prediction information to the UE 14. For example, in a case where it is necessary to convert the collision prediction information received from the object recognition apparatus 10 into a format that can be processed by the AR glasses 15, or in a case where the received collision prediction information includes unnecessary or redundant information, the information providing apparatus 11 may generate AR collision prediction information and transmit the AR collision prediction information to the UE 14.

Further, the information providing apparatus 11 may determine whether or not to transmit the collision prediction information (or the AR collision prediction information, and the same is also applied to description of the information providing apparatus 11), to the AR glasses 15 via the UE 14, and may transmit the collision prediction information to the UE 14 when it is determined to transmit. Here, for example, the information providing apparatus may acquire a user attribute (user feature) of the user 100 wearing the AR glasses 15 from the UE 14, to determine whether or not to transmit the collision prediction information to the AR glasses 15 on the basis of the user attribute. The user attribute of the user 100 is a fact attribute (information about a fact attribute) of the UE 14 and the user 100, and is an attribute that is based on a fact and is actually or objectively obtained from the UE 14 and the user 100. The information providing apparatus 11 can acquire a user attribute directly from the UE 14, for example. Alternatively, the information providing apparatus 11 can acquire a user attribute as information registered in predetermined web services by the user 100 of the UE 14. The user attribute of the user 100 can include at least one of demographic information about the user 100 or service usage information in one or more of the predetermined web services.

The demographic information is information indicating demographic user attributes such as gender, age, residential area, occupation, and family structure. The service usage information includes a service usage history of the user 100 in a web service. For example, in a case where an item (product or service) is purchased in a web service, the service usage history includes information regarding the purchased item (the name, genre, distributor, and the like of the item) and information about the purchase date and time.

As an example in which it is determined whether or not to transmit the collision prediction information to the AR glasses 15 on the basis of the user attribute acquired by the information providing apparatus 11, it is conceivable to use demographic information included in the user attribute of the user 100. For example, the information providing apparatus 11 may determine to transmit the collision prediction information to the AR glasses 15 via the UE 14 when the age included in the user attribute of the user 100 is old (for example, 65 or more years old). This is based on the presumption (assumption) that the older the age, the lower the mental and physical functions and the cognitive functions. On this presumption, conversely, the information providing apparatus 11 may determine not to transmit the collision prediction information to the AR glasses 15 via the UE 14 when the age included in the user attribute of the user 100 is not old (for example, under 65 years old).

Alternatively, the information providing apparatus 11 may determine whether or not to transmit the collision prediction information to the AR glasses 15 by using the service usage information included in the user attribute of the user 100. For example, the information providing apparatus 11 may determine to transmit the collision prediction information to the AR glasses 15 via the UE 14 when it is determined from the service usage information that the user 100 is old.

The UE 14 receives the collision prediction information (including the danger-prediction location coordinates and the object information) from the information providing apparatus 11, and transmits the information to the AR glasses 15. Here, the UE 14 can transmit the information to the AR glasses using a tethering function. For example, the UE 14 establishes a communication link with the AR glasses 15 in accordance with Bluetooth (registered trademark) specifications, and transmits the information to the AR glasses 15 via the communication link. Further, the UE 14 may generate AR content to be displayed in the AR glasses 15 and transmit the AR content to the AR glasses 15.

The AR glasses 15 generate AR content or receive AR content from the UE 14, and display the AR content on the transparent display. The AR content may include 3D content. The AR glasses 15 also perform the following functions by running an AR application for collision avoidance (collision avoidance AR application). First, the AR glasses 15 receive the collision prediction information (including the danger-prediction location coordinates and the object information) from the UE 14. On the basis of the received information, the AR glasses 15 determine whether or not the user 100 is approaching the dangerous area 17 indicated by the danger-prediction location coordinates by using Visual Positioning System (VPS). The VPS is a technology of specifying a location and an orientation of a mobile terminal (the AR glasses 15 and the UE 14 in the present embodiment) by performing positioning in the real world using a technology of image recognition or the like. For example, the AR glasses 15 specify a location of the user 100 by using Immersal as the VPS and data of point cloud data (PCD), and determine that the user 100 is approaching the dangerous area 17 (that is, a travel direction of user 100 is toward the dangerous area 17).

When determining that the user 100 is approaching the dangerous area 17, the AR glasses 15 generate AR content that prompts danger avoidance, and display the AR content (, that is, display an alert) on the transparent display. In the present embodiment, the AR glasses 15 derive a distance from the user 100 to the dangerous area 17 on the basis of the locations of the dangerous area 17 and the user 100 (the AR glasses 15 or the UE 14), and determine a danger level corresponding to the distance. The danger level indicates a possibility of collision between the user 100 and the bicycle 101 that is a mobile object. Then, the AR glasses 15 generate AR content corresponding to the determined danger level, and display the AR content on the transparent display. In the present embodiment, the danger level is expressed in percentage.

FIG. 2A to 2D illustrate examples of AR images including AR content. FIG. 2A illustrates an AR image 20 in a case where it is determined that the user 100 is not approaching the dangerous area 17. For example, in response to the user 100 performing a predetermined operation on the AR glasses 15 or the UE 14, a fixed phrase corresponding to the operation is displayed. For example, "Hello. Need help?" is displayed.

Figure 2B:
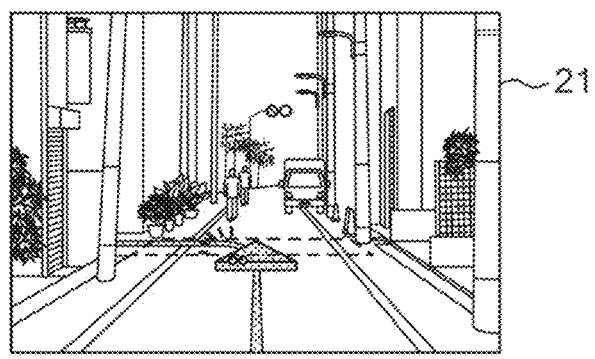
FIG. 2B illustrates another example of an image displayed in the AR glasses.
Figure 2C:
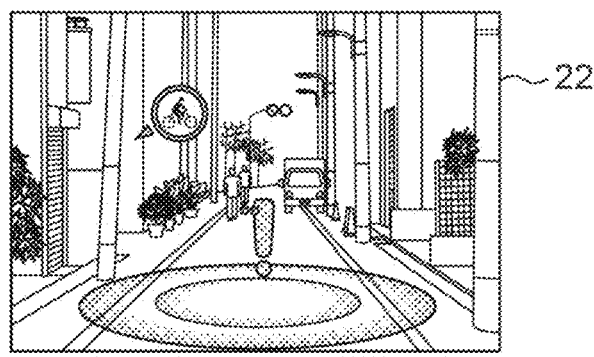
FIG. 2C illustrates another example of an image displayed in the AR glasses.
Figure 2D:
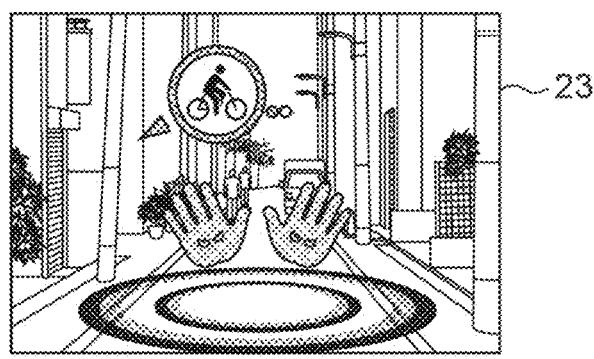
FIG. 2D illustrates another example of an image displayed in the AR glasses.

FIG. 2B illustrates an AR image 21 including AR content generated in a case where it is determined that the user 100 gets near to the dangerous area 17. FIG. 2C illustrates an AR image 22 including AR content generated in a case where it is determined that the user 100 gets nearer to the dangerous area 17 than in the case of FIG. 2B. FIG. 2D illustrates an AR image 23 including AR content generated in a case where it is determined that the user 100 gets nearer to the dangerous area 17 than in the case of FIG. 2C.

A danger level is determined to be higher as the distance between the dangerous area 17 and the user 100 is smaller, and the images displayed on the transparent display are displayed in the order of the AR images 21, 22, and 23 as the danger level increases.

FIG. 3 is a conceptual diagram illustrating a relationship between a danger level and AR content. The AR glasses 15 can generate AR content corresponding to the determined danger level. When the user 100 and the bicycle 101 are not close enough to collide immediately and the emergency level is relatively low, it is determined that the danger level is low. On the other hand, when there is a high possibility that the user 100 and the bicycle 101 collide with each other immediately and the emergency level is high, it is determined that the danger level is high. Thus, the AR glasses 15 generate AR content that more strongly reminds the user 100 of danger and danger avoidance as the danger level becomes higher, and display the AR content on the transparent display. In other words, a more explicit alert is displayed as the danger level becomes higher. In one example, when the danger level is less than a predetermined first threshold value, the AR glasses 15 determine that there is no danger and do not display an explicit alert (that is, display nothing regarding danger avoidance). Meanwhile, when the danger level is equal to or greater than the first threshold value and less than a predetermined second threshold value, the AR glasses 15 do not display an explicit alert, but generate and display AR content that prompts the user 100 to make a gentle change in a behavior (for example, distracting consciousness and pausing), to keep the user 100 away from the collision object 101. Further, when the danger level is equal to or greater than the second threshold value, the AR glasses 15 display an explicit alert to notify the user 100 that the collision object 101 is imminently approaching. When the danger level is less than the first threshold value, it means that a distance between the dangerous area 17 and the user 100 is equal to or greater than a predetermined first distance. When the danger level is equal to or greater than the first threshold value and less than the second threshold value, it means that a distance between the dangerous area 17 and the user 100 is equal to or greater than a predetermined second distance (the second distance<the first distance) and less than the first distance. When the danger level is equal to or greater than the second threshold value, it means that a distance between the dangerous area 17 and the user 100 is less than the second distance. Meanwhile, the first threshold value and the second threshold value may be set in advance in the collision avoidance AR application, or may be set by another unit.

In FIG. 3, AR images 30, 31, and 32 including AR content indicating recommendation of danger avoidance are AR images including AR content generated in a case where the danger level is equal to or greater than the first threshold value and less than the predetermined second threshold value. The AR images more explicitly indicate moving away from a danger as the danger level becomes higher. Further, an AR image 33 including AR content indicating an immediate need of danger avoidance is an AR image including AR content generated in a case where the danger level is equal to or greater than the second threshold value. AR content may use colors that more strongly appeal to the visual sense of the user 100 as the danger level becomes higher. AR content 34 is AR content corresponding to the danger level.

Flow of Processing in System

FIG. 4 illustrates a flowchart of processing performed in the communication system according to the present embodiment. This processing is roughly divided into information processing S40 for object recognition and information processing S41 for AR.

In S401 in the information processing S40 for object recognition, the RSU 12 detects an object. In the present embodiment, the RSU 12 detects the bicycle 101 that is a mobile object. When the object is detected, the RSU 12 derives detection data regarding object detection and transmits the detection data to the object recognition apparatus 10. Subsequently, in S402, the object recognition apparatus 10 derives collision prediction information on the basis of the detection data received from the RSU 12. The collision prediction information includes danger-prediction location coordinates and object information.

In S411 in the information processing S41 for AR subsequent to S402, the information providing apparatus 11 transmits the collision prediction information acquired from the object recognition apparatus 10 to the AR glasses 15 via the UE 14. In S411, the AR glasses 15 determine that a user is approaching a predicted collision point, and display AR content that prompts danger avoidance on the transparent display. The determination can be made using the VPS.

As a result of the above-described processing, the AR content that prompts danger avoidance is displayed in the AR glasses 15 immediately after the RSU 12 detects the bicycle 101, so that notification for avoidance of collision with the collision object 101 is realized in real time. By using the MEC servers (the object recognition apparatus 10 and the information providing apparatus 11) that are edge servers, it is possible to more quickly perform processing from detection of the bicycle 101 to display of the AR content.

Example of Functional Configuration of Object Recognition Apparatus

Figure 5:
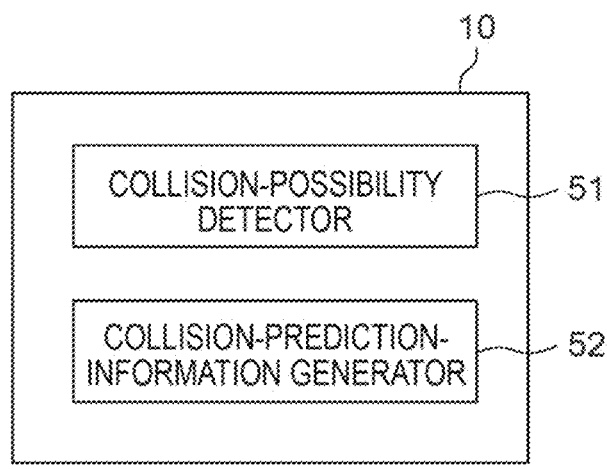
FIG. 5 illustrates an example of a functional configuration of an object recognition apparatus according to the embodiment.

FIG. 5 illustrates an example of a functional configuration of the object recognition apparatus 10. The object recognition apparatus 10 includes a collision-possibility detector 51 and a collision-prediction-information generator 52, as an example of the functional configuration. The collision-possibility detector 51 detects a collision possibility from various parameters received from the RSU 12. The collision-prediction-information generator 52 generates collision prediction information including danger-prediction location coordinates and object information.

Example of Functional Configuration of Information Providing Apparatus

Figure 6:
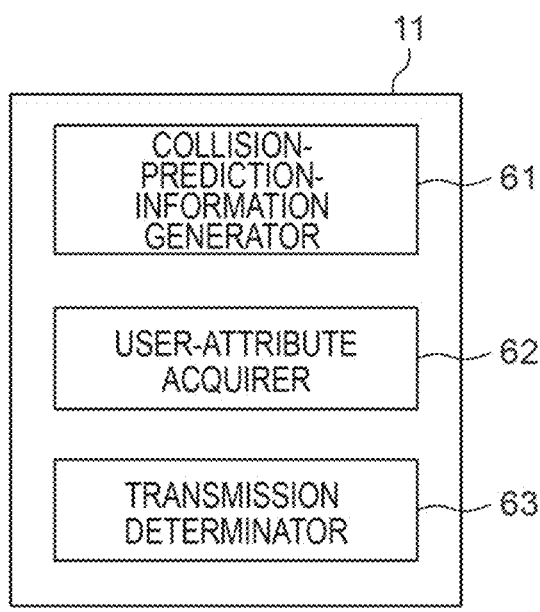
FIG. 6 illustrates an example of a functional configuration of an information providing apparatus according to the embodiment.

FIG. 6 illustrates an example of a functional configuration of the information providing apparatus 11. The information providing apparatus 11 includes a collision-prediction-information generator 61, a user-attribute acquirer 62, and a transmission determinator 63, as an example of the functional configuration. The collision-prediction-information generator 61 generates collision prediction information for the AR glasses 15 (AR collision prediction information) on the basis of collision prediction information received from the object recognition apparatus 10. The user-attribute acquirer 62 acquires a user attribute of the user 100 of the UE 14 from the UE 14 that can perform communication via the information providing apparatus 11. The transmission determinator 63 determines whether or not to transmit the collision prediction information (or the AR collision prediction information) to the UE 14 on the basis of the user attribute of the user 100 acquired by the user-attribute acquirer 62. When the transmission determinator 63 determines to transmit the collision prediction information (or the AR collision prediction information) to the UE 14, the information is transmitted to the UE 14.

Example of Functional Configuration of AR Glasses

Figure 7:
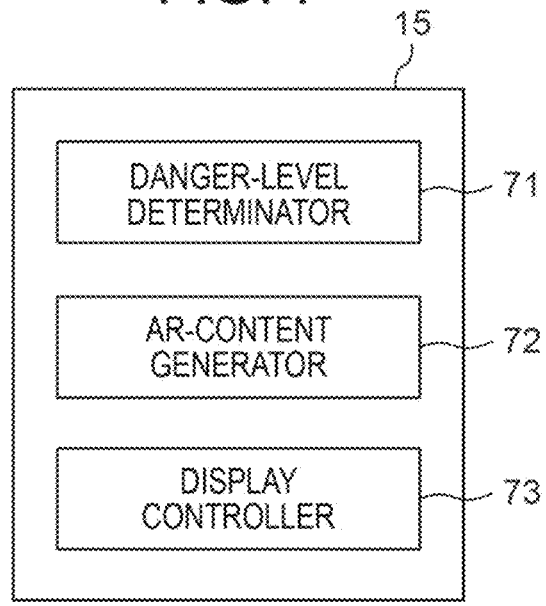
FIG. 7 illustrates an example of a functional configuration of the AR glasses according to the embodiment.

FIG. 7 illustrates an example of a functional configuration of the AR glasses 15. The example of the functional configuration of the AR glasses 15 illustrated in FIG. 7 corresponds to at least the functions included in the collision avoidance AR application. As an example of the functional configuration, the AR glasses 15 include a danger-level determinator 71, an AR-content generator 72, and a display controller 73. The danger-level determinator 71 determines a danger level of collision between the user 100 and a mobile object (the bicycle 101 in the present embodiment). To this end, first, the danger-level determinator 71 determines whether or not the user 100 is approaching the dangerous area 17 indicated by danger-prediction location coordinates on the basis of collision prediction information (including danger-prediction location coordinates and object information) received from the UE 14. When determining that the user 100 is approaching the dangerous area 17, the danger-level determinator 71 derives a distance to the dangerous area 17 on the basis of the locations of the dangerous area 17 and the user 100 (the AR glasses 15 or the UE 14), and determines a danger level corresponding to the distance. The AR-content generator 72 generates AR content to be displayed on the transparent display. The AR-content generator 72 can generate AR content corresponding to the danger level determined by the danger-level determinator 71. The AR-content generator 72 may acquire AR content that is generated in advance and stored in a storage unit, or may generate AR content by combining information stored in the storage unit. The display controller 73 displays the AR content generated by the AR-content generator 72, on the transparent display. In a case where the—AR content generator 72 generates parallax images (left-eye image and right-eye image having different parallaxes), the display controller 73 may control the transparent display such that each parallax image is displayed on a region intended for use in displaying a parallax image in the transparent display.

Note that, in the present embodiment, it is assumed that the collision avoidance AR application is run in the AR glasses 15, but at least some functions of the application may be performed by the UE 14. For example, the UE 14 held by the user 100 wearing the AR glasses 15 may be configured to determine a danger level described in the present embodiment, generate AR content, and control the AR glasses 15 such that the AR content is displayed on the transparent display of the AR glasses 15.

Hardware Configuration of Communication Apparatus

Figure 8:
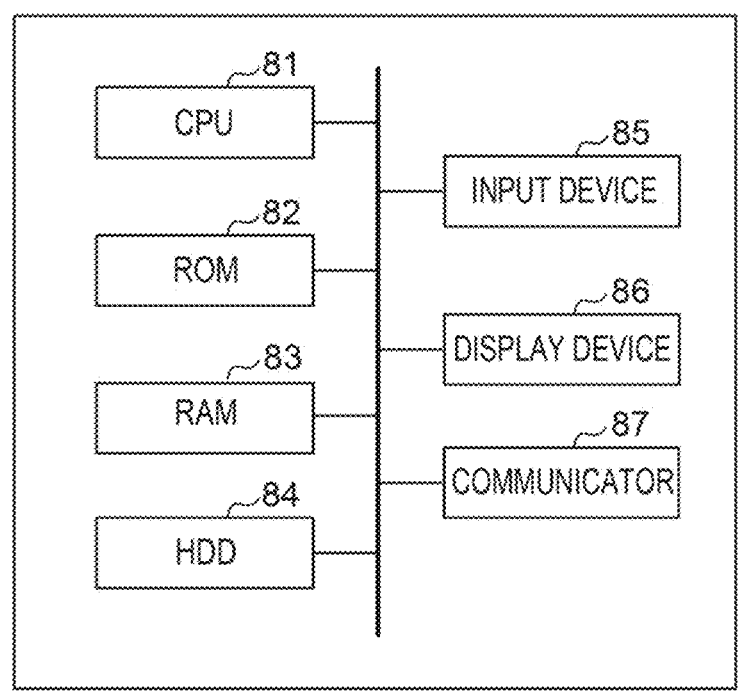
FIG. 8 illustrates an example of a hardware configuration of a communication apparatus according to the embodiment.

FIG. 8 illustrates an example of a hardware configuration of the communication apparatus (the object recognition apparatus 10, the information providing apparatus 11, the UE 14, and the AR glasses 15) described in the present embodiment. The communication apparatus includes, as an example of the hardware configuration, a central processing unit (CPU) 81, a read only memory (ROM) 82, a random access memory (RAM) 83, a hard disk drive (HDD) 84, an input device 85, a display device 86, and a communicator 87.

The central processing unit (CPU) 81 includes one or more processors and comprehensively controls operations in the communication apparatus. The CPU 81 may be replaced with one or more processors such as an application specific integrated circuit (ASIC), a field programmable gate array (FPGA), a digital signal processor (DSP), and a graphics processing unit (GPU).

The read only memory (ROM) 82 is a nonvolatile memory in which a control program and the like required for the CPU 81 to perform processing is stored. Note that the program may be stored in a non-volatile memory such as the HDD 84 or a solid state drive (SSD), or an external memory such as a detachable storage medium (not illustrated).

The random access memory (RAM) 83 is a volatile memory, and functions as a main memory, a work area, and the like of the CPU 81. That is, the CPU 81 loads a necessary program or the like from the ROM 82 into the RAM 83 in performing processing, and executes the program or the like to perform various functional operations.

In the HDD 84, for example, various kinds of data, various kinds of information, and the like required for the CPU 81 to perform processing using a program, are stored. Further, in the HDD 84, for example, various kinds of data, various kinds of information, and the like acquired by processing performed by the CPU 81 using a program, are stored. Note that the storage may be achieved using a non-volatile memory such as an SSD or an external memory such as a detachable storage medium, together with the HDD 84, or instead of the HDD 84.

The input device 85 is configured to receive an operation performed by a user. The input device 85 can receive, for example, an operation performed on another communication apparatus (for example, a smartphone) configured to be communicable with the communication apparatus, an operation by a gesture, or an operation by a voice.

The display device 86 is configured to display various kinds of information. In a case where the communication apparatus is the AR glasses 15, the display device 86 is a transparent display. The type of the transparent display is not limited to any particular type, and may be a transparent organic EL display, a transparent inorganic EL display, a transparent liquid crystal display (LCD), or the like.

The communicator 87 is an interface that controls communication between the communication apparatus and an external apparatus.

While the specific embodiment has been described above, the embodiment is merely an example, and is not intended to limit the scope of the present disclosure. The apparatuses and methods described in the present specification can be embodied in other forms than those described above. In addition, omissions, substitutions, and changes can be appropriately made to the above-described embodiment without departing from the scope of the present disclosure. Forms with such omissions, substitutions, and changes are included in the scope of what is described in the claims and equivalents thereof, and belong to the technical scope of the present disclosure.

The present disclosure includes the following embodiments.

[1] AR glasses worn by a user, including one or more processors, wherein at least one of the one or more processors performs: receiving processing of receiving collision prediction information including location information about a dangerous area where there is a danger that the user and a mobile object collide and information regarding a trajectory of the mobile object, from an external apparatus; determining processing of deriving a distance between the dangerous area and the user on the basis of the collision prediction information, to determine a danger level corresponding to the distance; generating processing of generating content that prompts danger avoidance in accordance with the danger level; and display control processing of displaying the content on a display.

[2] The AR glasses according to [1], wherein the determining processing includes determining the danger level such that the danger level increases as the distance decreases.

[3] The AR glasses according to [1] or [2], wherein the generating processing includes generating the content that more strongly reminds the user of a danger and danger avoidance as the danger level becomes higher.

[4] The AR glasses according to any one of [1] to [3], wherein the generating processing includes generating the content that indicates moving away from the mobile object when the danger level is equal to or greater than a first threshold value and less than a second threshold value, and generating the content that indicates that the mobile object is approaching the user when the danger level is equal to or greater than the second threshold value.

[5] A control method performed by a communication apparatus, including: receiving collision prediction information including location information about a dangerous area where there is a danger that a user wearing AR glasses and a mobile object collide and information regarding a trajectory of the mobile object, from an external apparatus; deriving a distance between the dangerous area and the user on the basis of the collision prediction information, to determine a danger level corresponding to the distance; generating content that prompts danger avoidance in accordance with the danger level; and displaying the content on a display of the AR glasses.

[6] A communication system including: a first apparatus; a second apparatus; and AR glasses, wherein each of the first apparatus, the second apparatus, and the AR glasses includes one or more processors, and at least one of the one or more processors performs: processing in which the first apparatus detects a mobile object, generates collision prediction information including location information about a dangerous area where there is a danger that a user wearing the AR glasses collides with the mobile object and information regarding a trajectory of the mobile object, and transmits the collision prediction information to the second apparatus; processing in which the second apparatus receives the collision prediction information from the first apparatus, generates AR collision prediction information based on the collision prediction information, and transmits the AR collision prediction information to the AR glasses; and processing in which the AR glasses receive the AR collision prediction information from the second apparatus, derive a distance between the dangerous area and the user on the basis of the AR collision prediction information, generate content that prompts danger avoidance in accordance with a danger level determined in accordance with the distance, and display the content on the display.

[7] The communication system according to [6], wherein processing in which the second apparatus further acquires a user attribute of the user, determines whether or not to transmit the AR collision prediction information to the AR glasses on the basis of the user attribute, and transmits the AR collision prediction information to the AR glasses when it is determined to transmit the AR collision prediction information, is further performed.

[8] The communication system according to [7], wherein the user attribute includes at least one of demographic information about the user or information about the user's usage of service provided by a web service.

[9] The communication system according to any one of [6] to [8], wherein the first apparatus and the second apparatus are MEC servers.

What is claimed is:
1. AR glasses worn by a user, comprising
one or more processors, wherein
at least one of the one or more processors performs:
receiving collision prediction information including location information about a dangerous area where the user is predicted to collide with a mobile object and information regarding a trajectory of the mobile object, from an external apparatus;

deriving a distance between the dangerous area and the user on the basis of the collision prediction information, to determine a danger level corresponding to the distance and being expressed as a percentage indicating a possibility of collision;

generating content that prompts danger avoidance in accordance with the danger level, wherein the generated content indicates a recommendation of danger avoidance when the danger level is less than a threshold value, and indicates that the mobile object is approaching the user when the danger level is equal to or greater than the threshold value; and displaying the content on a display.

2. The AR glasses according to claim 1, wherein the danger level increases as the distance decreases.

3. The AR glasses according to claim 1, wherein the generated content that strongly reminds the user of a danger and danger avoidance as the danger level becomes higher.

4. The AR glasses according to claim 3, wherein the generated content indicates moving away from the mobile object when the danger level is equal to or greater than a first threshold value and less than the threshold value, and indicates that the mobile object is approaching the user when the danger level is equal to or greater than the threshold value.

5. A control method performed by a communication apparatus, comprising:

receiving collision prediction information including location information about a dangerous area where a user wearing AR glasses is predicted to collide with a mobile object and information regarding a trajectory of the mobile object, from an external apparatus;

deriving a distance between the dangerous area and the user on the basis of the collision prediction information, to determine a danger level corresponding to the distance and being expressed as a percentage indicating a possibility of collision;

generating content that prompts danger avoidance in accordance with the danger level, wherein the generated content indicates a recommendation of danger avoidance when the danger level is less than a threshold value, and indicates that the mobile object is approaching the user when the danger level is equal to or greater than the threshold value; and displaying the content on a display of the AR glasses.

6. A communication system comprising: a first apparatus; a second apparatus; and AR glasses, wherein each of the first apparatus, the second apparatus, and the AR glasses includes one or more processors, and at least one of the one or more processors performs:

processing in which the first apparatus detects a mobile object, generates collision prediction information including location information about a dangerous area where a user wearing the AR glasses is predicted to collide with the mobile object and information regarding a trajectory of the mobile object, and transmits the collision prediction information to the second apparatus;

processing in which the second apparatus receives the collision prediction information from the first apparatus, generates AR collision prediction information based on the collision prediction information, and transmits the AR collision prediction information to the AR glasses; and processing in which the AR glasses receive the AR collision prediction information from the second apparatus, derive a distance between the dangerous area and the user on the basis of the AR collision prediction information, generate content that prompts danger avoidance in accordance with a danger level determined in accordance with the distance, and display the content on a display.

7. The communication system according to claim 6, wherein processing in which the second apparatus further acquires a user attribute of the user, determines whether or not to transmit the AR collision prediction information to the AR glasses on the basis of the user attribute, and transmits the AR collision prediction information to the AR glasses when it is determined to transmit the AR collision prediction information, is further performed.

8. The communication system according to claim 7, wherein the user attribute includes at least one of demographic information about the user or information about the user's usage of service provided by a web service.

9. The communication system according to claim 6, wherein the first apparatus and the second apparatus are MEC servers.

* * * * *